United States Patent
Ishii et al.

(10) Patent No.: US 10,059,364 B2
(45) Date of Patent: Aug. 28, 2018

(54) ELECTRIC POWER STEERING APPARATUS

(71) Applicant: NSK LTD., Tokyo (JP)

(72) Inventors: Tatsuya Ishii, Maebashi (JP); Takeshi Yamamoto, Maebashi (JP); Seiichi Moriyama, Maebashi (JP)

(73) Assignee: NSK LTD., Tokyo (JP)

( * ) Notice: Subject to any disclaimer, the term of this patent is extended or adjusted under 35 U.S.C. 154(b) by 269 days.

(21) Appl. No.: 14/387,700

(22) PCT Filed: Oct. 28, 2013

(86) PCT No.: PCT/JP2013/079176
§ 371 (c)(1),
(2) Date: Sep. 24, 2014

(87) PCT Pub. No.: WO2014/069422
PCT Pub. Date: May 8, 2014

(65) Prior Publication Data
US 2015/0298724 A1    Oct. 22, 2015

(30) Foreign Application Priority Data

Oct. 29, 2012  (JP) .................................. 2012-237790
Oct. 29, 2012  (JP) .................................. 2012-237791

(51) Int. Cl.
*B62D 5/04*  (2006.01)

(52) U.S. Cl.
CPC ......... *B62D 5/0403* (2013.01); *B62D 5/0409* (2013.01)

(58) Field of Classification Search
CPC .................................................... B62D 5/403
(Continued)

(56) References Cited

U.S. PATENT DOCUMENTS

| 6,260,654 | B1 * | 7/2001 | Ito ........................ B62D 5/0409 180/443 |
| 2006/0086559 | A1 * | 4/2006 | Segawa .................... B62D 1/16 180/444 |

(Continued)

FOREIGN PATENT DOCUMENTS

| CN | 101400972 A | 4/2009 |
| EP | 2080686 A1 | 7/2009 |

(Continued)

OTHER PUBLICATIONS

Communication dated Mar. 1, 2016 issued by Japanese Intellectual Property Office in counterpart Japanese Patent Application No. 2013-556698.

(Continued)

*Primary Examiner* — Joseph M Rocca
*Assistant Examiner* — Conan D Duda
(74) *Attorney, Agent, or Firm* — Sughrue Mion, PLLC

(57) ABSTRACT

An electric power steering apparatus has a first rolling bearing and a second rolling bearing rotatably supporting an output shaft. The first rolling bearing is provided between an inner peripheral surface of a through-hole of a gear housing and an outer peripheral surface of the output shaft. The second rolling bearing is provided between an inner peripheral surface of an intermediate plate and the outer peripheral surface of the output shaft. The intermediate plate has an outer peripheral portion supported and fixed in an opening portion of the gear housing.

9 Claims, 18 Drawing Sheets

(58) Field of Classification Search
USPC .................................................. 180/443, 444
See application file for complete search history.

(56) References Cited

U.S. PATENT DOCUMENTS

| | | | |
|---|---|---|---|
| 2006/0175123 A1* | 8/2006 | Yabe ................. | B29C 45/14311 180/444 |
| 2007/0256887 A1* | 11/2007 | Hirakawa ............ | B62D 5/0403 180/444 |
| 2008/0250892 A1* | 10/2008 | Gordy ....................... | F16C 1/10 74/501.5 R |
| 2008/0251311 A1* | 10/2008 | Waibel ................... | B62D 5/008 180/443 |
| 2009/0050399 A1* | 2/2009 | Segawa .................... | B62D 1/20 180/444 |
| 2010/0288069 A1* | 11/2010 | Imamura ................ | B62D 1/189 74/493 |
| 2010/0314192 A1* | 12/2010 | Nagase ................ | B62D 5/0406 180/444 |
| 2010/0320026 A1* | 12/2010 | Yoshida ............... | B62D 5/0406 180/444 |
| 2011/0000737 A1* | 1/2011 | Nagase ................ | B62D 5/0406 180/444 |
| 2011/0011666 A1* | 1/2011 | Hori ....................... | B62D 5/008 180/444 |
| 2011/0011667 A1* | 1/2011 | Kang ....................... | B62D 6/10 180/444 |
| 2011/0024223 A1* | 2/2011 | Konrad ................. | B62D 5/008 180/444 |
| 2011/0108354 A1* | 5/2011 | Yao ....................... | B62D 5/008 180/444 |
| 2011/0108355 A1* | 5/2011 | Shiina ................... | B62D 5/008 180/444 |
| 2011/0120798 A1* | 5/2011 | Kawada .................. | B62D 1/16 180/444 |

FOREIGN PATENT DOCUMENTS

| | | | | |
|---|---|---|---|---|
| EP | 2243685 A2 * | 10/2010 | .............. | B62D 5/04 |
| JP | 59-107560 U | 7/1984 | | |
| JP | 2001-138930 A | 5/2001 | | |
| JP | 2002-518242 A | 6/2002 | | |
| JP | 2003-172332 A | 6/2003 | | |
| JP | 2003-252218 A | 9/2003 | | |
| JP | 2007-223501 A | 9/2007 | | |
| JP | 2007-223684 A | 9/2007 | | |
| JP | 2008-213674 A | 9/2008 | | |
| JP | 2008-279936 A | 11/2008 | | |
| JP | 2008-540777 A | 11/2008 | | |
| JP | 2009-298246 A | 12/2009 | | |
| JP | 2010-943 A | 1/2010 | | |
| JP | 2010-247790 A | 11/2010 | | |
| JP | 2012-51511 A | 3/2012 | | |
| JP | 2012-067856 A | 4/2012 | | |
| WO | 2010/013490 A1 | 2/2010 | | |

OTHER PUBLICATIONS

Communication dated Sep. 9, 2015 issued by the State Intellectual Property Office of the People's Republic of China in counterpart Chinese Application No. 201380001906.9.

Search Report dated Dec. 17, 2013, issued by the International Searching Authority in counterpart International Application No. PCT/JP2013/079176.

Office Action dated Jul. 28, 2015 issued by the Japanese Patent Office in counterpart Japanese Patent Application No. 2013-556698.

* cited by examiner

50a(51a)

50b(51b)

50c(51c)

ELECTRIC POWER STEERING APPARATUS

TECHNICAL FIELD

The invention relates to an electric power steering apparatus having an electric motor as an auxiliary power source and reducing a steering force with which a user operates a steering wheel.

BACKGROUND ART

As shown in FIG. 15, a steering apparatus for an automobile is configured such that rotation of a steering wheel 1 is transmitted to an input shaft 3 of a steering gear unit 2, a pair of left and right tie-rods 4, 4 is pushed/pulled in connection with rotation of the input shaft 3 and a steering angle is thus applied to front wheels. The steering wheel 1 is supported and fixed to a rear end portion of a steering shaft 5. The steering shaft 5 is rotatably supported to a cylindrical steering column 6 with being axially inserted into the steering column 6. A front end portion of the steering column 6 is connected and fixed to a rear end portion of a housing 9 in which a worm decelerator 7, a torque measuring device 8 (see FIG. 16) and the like configuring an electric power steering apparatus are accommodated. An electric motor 10 that is a power source of the electric power steering apparatus is supported and fixed to the housing 9.

When the steering shaft 5 is rotated by the steering wheel 1, a direction and amplitude of torque applied to the steering shaft 5 are measured by the torque measuring device 8. The torque measuring device 8 has an input shaft 12, an output shaft 13 and a displacement measuring device 14 (see FIG. 16) that is configured to measure a relative displacement amount as regards a rotating direction between the input shaft 12 and the output shaft 13. The input shaft 12 and the output shaft 13 are rotatably supported in the housing 9 and are connected to each other by a torsion bar 11. Since the configuration and operation of the torque measuring device 8 are well known, the detailed descriptions thereof are omitted. Based on a measurement result of the torque measuring device 8, the electric motor 10 applies auxiliary torque to the output shaft 13 in the same direction as the operation direction of the steering wheel 1, thereby rotating the output shaft 13 with torque larger than the torque input to the input shaft 12 from the steering shaft 5.

A front end portion of the output shaft 13 is coupled to a rear end portion of an intermediate shaft 16 via a universal joint 15a. A front end portion of the intermediate shaft 16 is coupled to the input shaft 3 via a separate universal joint 15b. In the specification, a front-rear direction is a front-rear direction of a vehicle in a state in which the electric power steering apparatus is mounted on the vehicle, and also includes an inclined case relative to a horizontal direction. A tilt mechanism configured to adjust an upper-lower position of the steering wheel 1 and a telescopic mechanism configured to adjust a front-rear position thereof are mounted to the steering apparatus for an automobile shown in FIG. 15. An intermediate portion of the steering column 6 is supported to a support bracket 18 supported to a vehicle body 17 so that an upper-lower position and a front-rear position thereof can be adjusted. In order to configure the tilt mechanism, a support cylinder 19 is provided at a front-upper end portion of the housing 9 and is supported to the vehicle body 17 so that it can be swing-displaced about a horizontal axis. In order to configure the telescopic mechanism, the steering shaft 5 has an inner shaft and an outer shaft that are combined to transmit the torque and to be expandable and contractible, and the steering column 6 has an outer column and an inner column that are combined to be expandable and contractible.

As a more specific structure of the electric power steering apparatus as described above, FIG. 16 shows a structure disclosed in Patent Document 1 and FIG. 17 shows a structure disclosed in Patent Document 2. First, in the structure shown in FIG. 16, a housing 9a for accommodating components except for the electric motor 10 (see FIG. 15) of the electric power steering apparatus is configured by combining a gear housing 20 and a housing cover 21. The output shaft 13 is rotatably supported in the housing 9a by a front-side rolling bearing 22 that is held on an inner peripheral surface of a front end portion of the gear housing 20 and a rear-side rolling bearing 23 that is held on an inner peripheral surface of a front end portion of the housing cover 21. The input shaft 12 is rotatably supported in the housing cover 21 by a separate rolling bearing 24 (a radial needle bearing) that is held on an inner peripheral surface of an intermediate portion of the housing cover 21.

In the structure shown in FIG. 17, a partition plate 25 is fitted at a portion of an inner side of a gear housing 20a near the rear end. An elastic material 26 is interposed between an outer peripheral surface of the partition plate 25 and an inner peripheral surface of the gear housing 20a. An output shaft 13a is rotatably supported in the housing 9a by a front-side rolling bearing 22a that is held on an inner peripheral surface of a front end portion of the gear housing 20a and a rear-side rolling bearing 23a that is held on an inner peripheral surface of the partition plate 25. An input shaft 12a is rotatably supported in a housing cover 21a by a separate rolling bearing 24a. Since the structure shown in FIG. 17 does not have a telescopic mechanism, both a steering shaft 5a and a steering column 6a are not a telescopic type.

In the structure shown in FIG. 16, the housing 9a is configured by combining the gear housing 20 and the housing cover 21 and the output shaft 13 is rotatably supported in the housing 9a by the front-side rolling bearing 22 and the rear-side rolling bearing 23. The corresponding operations are troublesome, so that manufacturing efficiency of the electric power steering apparatus is lowered.

In contrast, in the structure shown in FIG. 17, there is no troublesome assembling operation as described above. However, it is difficult to maintain positioning precision of the output shaft 13a for a long time. That is, when the elastic material 26 provided between the outer peripheral surface of the partition plate 25 and the inner peripheral surface of the gear housing 20a is deteriorated due to longtime using and the elasticity thereof is thus lowered, the partition plate 25 may slip. When the partition plate 25 slips, an engaging resistance between a worm and a worm wheel of the worm decelerator 7a is increased or the detection precision of the torque measuring device 8a is degraded, which lowers the performance of the electric power steering apparatus.

PRIOR ART DOCUMENTS

Patent Document 1: JP2009-298246A
Patent Document 2: JP2002-518242A

SUMMARY OF INVENTION

Problem to be Solved by Invention

An object of the invention is to provide an electric power steering apparatus that can be easily assembled and can keep sufficient performance for a long time.

Means for Solving the Problem

According to an aspect of the invention, an electric power steering apparatus includes an output shaft, a gear housing, a first rolling bearing and a second rolling bearing, a housing cover, and an intermediate plate. The output shaft rotates to apply a steering angle to wheels. The gear housing has a through-hole inside which the output shaft is rotatably supported, and is configured to accommodate a decelerator which reduces a speed of a rotation of a driving shaft of an electric motor to transmit the rotation to the output shaft. The first rolling bearing and the second rolling bearing are spaced from each other in an axial direction of the output shaft to rotatably support the output shaft on the gear housing. The housing cover is coupled to and secured to the gear housing, and is configured such that an input shaft is inserted therein, the input shaft being rotated by a steering shaft to be rotated based on an operation of a steering wheel.

The first rolling bearing is provided between an inner peripheral surface of the through-hole and an outer peripheral surface of the output shaft. The second rolling bearing is provided between an inner peripheral surface of the intermediate plate and the outer peripheral surface of the output shaft. The intermediate plate has an outer peripheral portion supported and fixed in an opening portion of the gear housing.

A rear portion of an inner peripheral surface of the gear housing may have a rearwardly facing step surface, and an outer peripheral portion of the intermediate plate may be held between the step surface and a front end surface of the housing cover.

An intermediate flange portion formed on an outer peripheral surface of the intermediate plate may be held between a front flange portion formed on an outer peripheral surface of a rear end portion of the gear housing and a rear flange portion formed on an outer peripheral surface of a front end portion of the housing cover.

The intermediate plate may be press-fitted and fixed to a rear portion of an inner peripheral surface of the gear housing by interference fit.

The rear portion of the inner peripheral surface of the gear housing may have a rearwardly facing step surface, and a front surface of the outer peripheral portion of the intermediate plate may abut on the step surface such that the intermediate plate is positioned in the axial direction of the output shaft relative to the gear housing.

A front end surface of the housing cover may abut on a rear surface of the outer peripheral portion of the intermediate plate.

The rear surface of the outer peripheral portion of the intermediate plate may be formed with a ridge in a circumferential direction, and the ridge may be flattened by the front end surface of the housing cover.

The rear surface of the outer peripheral portion of the intermediate plate may be formed with a plurality of projections in a circumferential direction, and the projections may be flattened by the front end surface of the housing cover.

The first rolling bearing may be provided at an intermediate portion of the output shaft, and the second rolling bearing may be provided at a portion of the output shaft closer a rear end of the output shaft than the intermediate portion.

The intermediate plate may be made by an injection molding of a thermosetting resin or a thermoplastic resin containing glass fibers.

Effects of Invention

One of the two rolling bearings that rotatably support the output shaft to the gear housing is provided between the inner peripheral surface of the intermediate plate and the outer peripheral surface of the output shaft. Since the intermediate plate is mounted in a state in which the rolling bearings can be checked with naked eyes, before the housing cover is mounted, it is possible to easily assemble the electric power steering apparatus.

The intermediate plate is supported and fixed in the opening portion of the gear housing. Thereby, it is possible to maintain the performance of the electric power steering apparatus for a long time. That is, since the intermediate plate is supported and fixed to the gear housing, a posture of the rolling bearing held on the inner peripheral surface of the intermediate plate is not changed even after the longtime using. For this reason, a posture of the output shaft that is rotatably supported by the rolling bearings is not changed, so that an engaged state of the decelerator is not degraded and the measuring precision of the torque measuring device is not deteriorated.

EMBODIMENTS OF INVENTION

Figure 15:
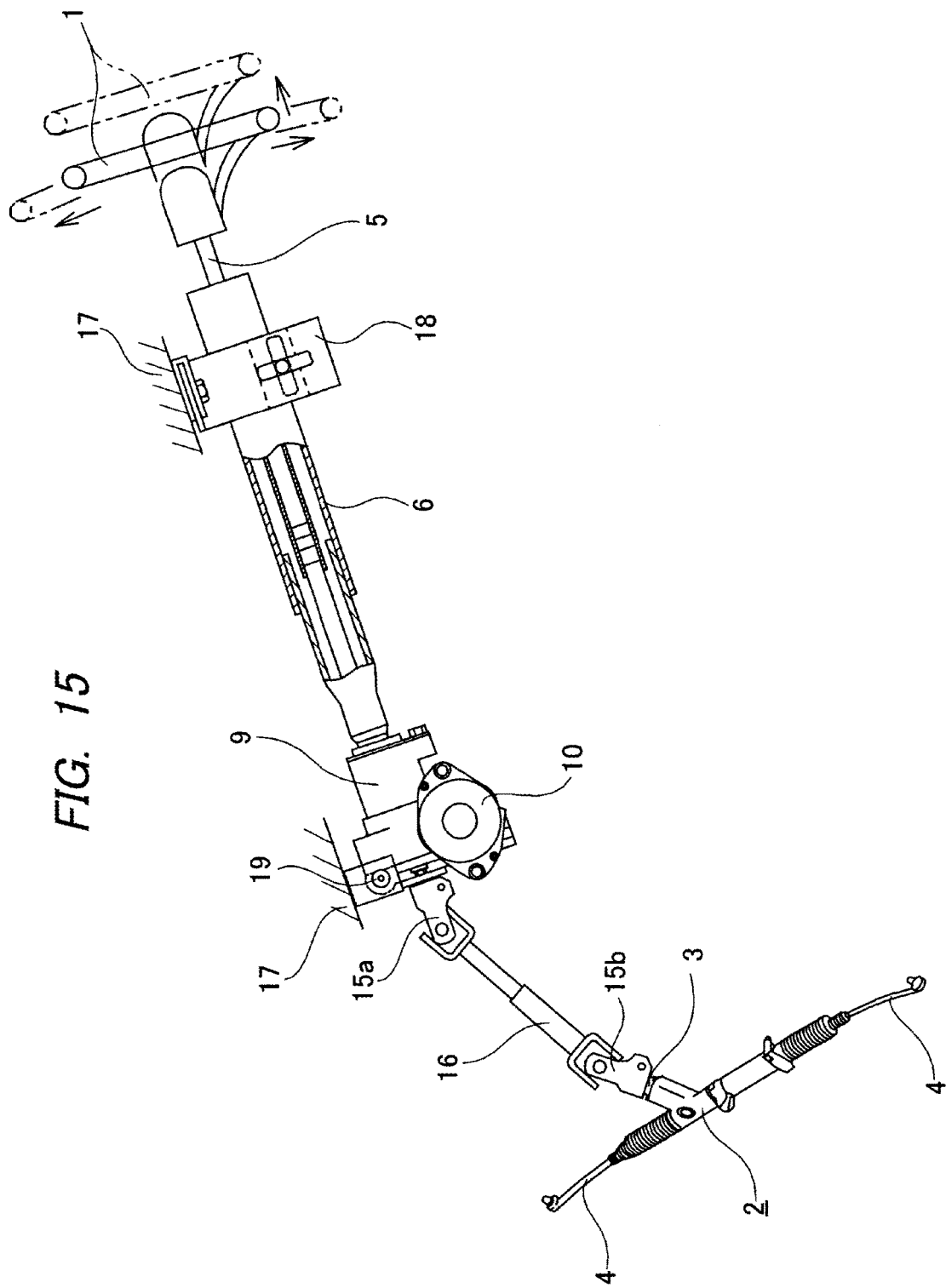
FIG. 15 is a partially cut side view showing an example of an electric power steering apparatus.
Figure 16:
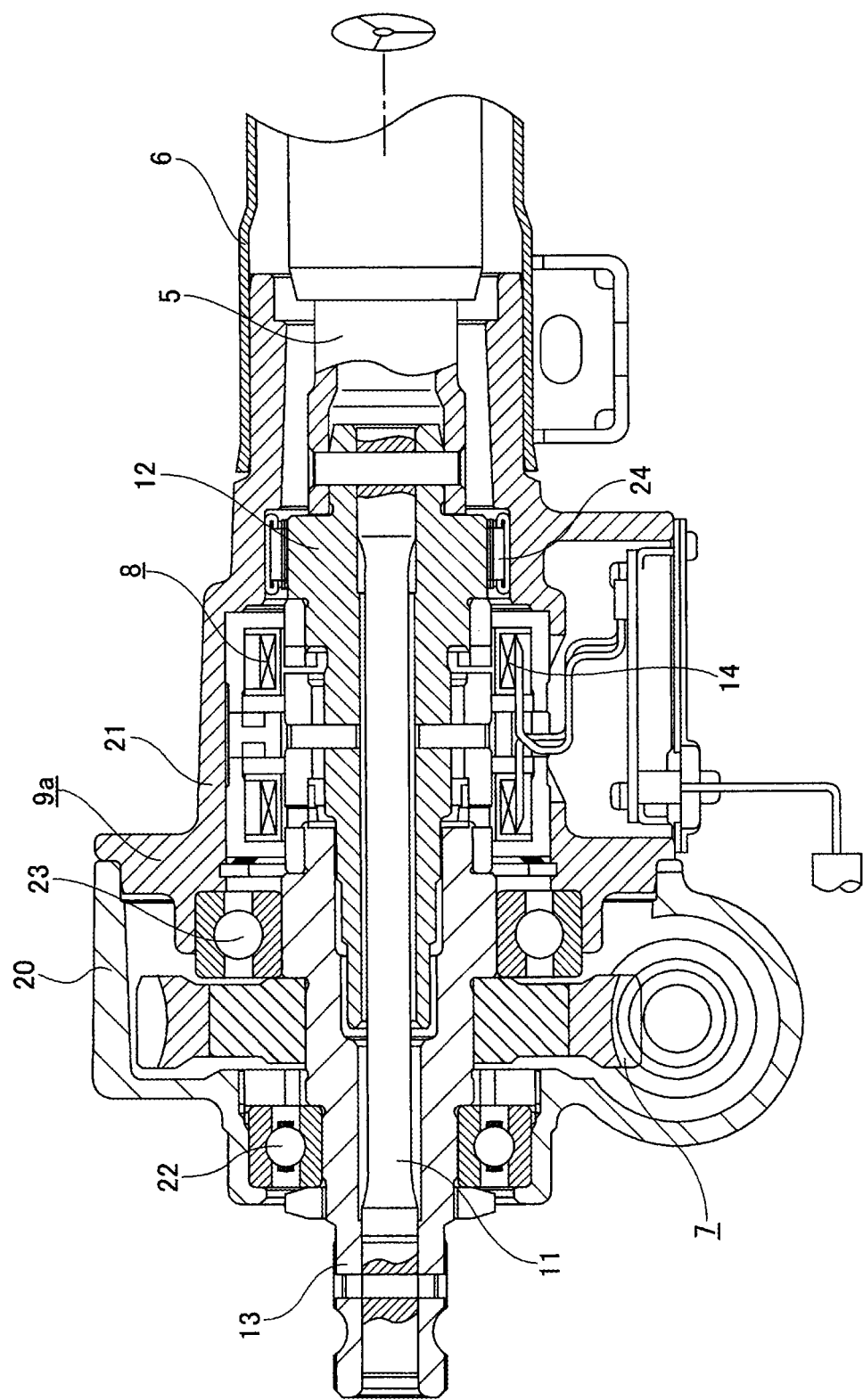
FIG. 16 is a partial sectional view of an electric power steering apparatus according to the first conventional art.
Figure 17:
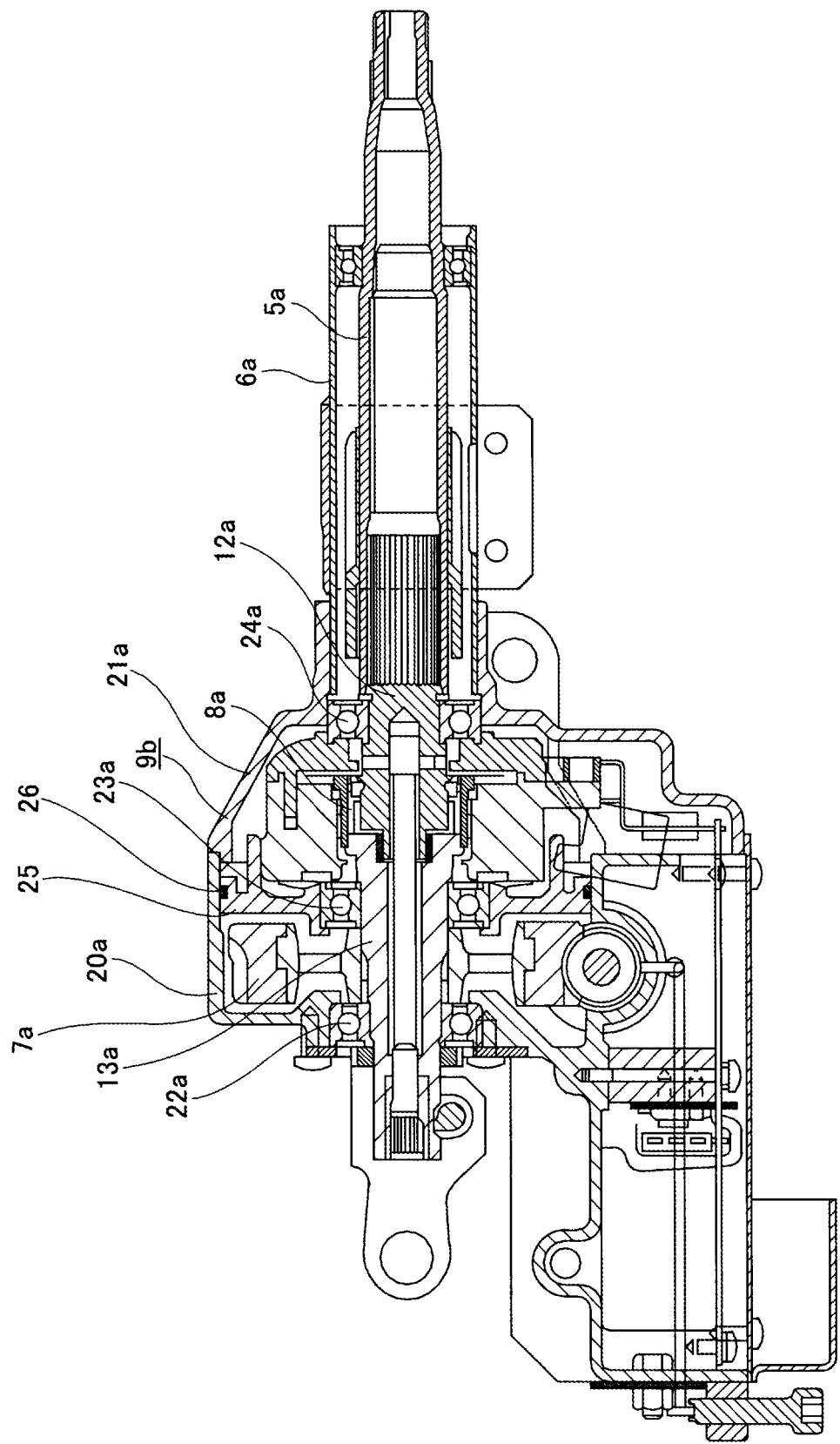
FIG. 17 is a partial sectional view of an electric power steering apparatus according to the second conventional art.

FIGS. 1 to 6 show an electric power steering apparatus according to a first embodiment of the invention. The electric power steering apparatus has an input shaft 12b, an output shaft 13b and a housing 9 that rotatably supports the input shaft 12b and the output shaft 13b. The housing 9 is configured by combining a gear housing 20b and a housing cover 21b. Each of the gear housing 20b and the housing cover 21b is formed by a die-casting molding using an aluminum alloy or injection molding using a high-functional resin, for example. The input shaft 12b and the output shaft 13b are formed to have a hollow circular tube shape and are connected by a torsion bar 11 with being concentrically arranged. That is, front and rear end portions of the torsion bar 11 are respectively connected to a front end portion of the output shaft 13b and a rear end portion of the input shaft 12b. The output shaft 13b is coupled to an input shaft 3 (see FIG. 15) of a steering gear unit 2 via universal joints 15a, 15b and an intermediate shaft 16 and is configured to rotate the input shaft 3 in a predetermined direction by a predetermined amount, thereby applying a predetermined steering angle to front wheels. The input shaft 12b can be rotated by a steering shaft 5.

Upon the steering, the input shaft 12b and the output shaft 13b are relatively displaced in a rotating direction while elastically deforming the torsion bar 11 in a torsion direction by steering torque applied to the input shaft 12b and a resistance against rotation of the output shaft 13b. The relative displacement amount is measured by a torque measuring device 8b provided between an outer peripheral surface of an intermediate portion of the input shaft 12b and an outer peripheral surface of a rear end portion of the output shaft 13b. A measurement signal of the torque measuring device 8b is transmitted to a controller for controlling energization to an electric motor 10 (see FIG. 15). The controller controls an energization direction and an energization amount to the electric motor 10 and applies steering assist force to the output shaft 13b through a worm decelerator 7a. A radial needle bearing 27 is provided between an outer peripheral surface of the front end portion of the input shaft 12b and a portion of an inner peripheral surface of the output shaft 13b near the rear end, thereby ensuring the concentricity of the input shaft 12b and the output shaft 13b.

An intermediate plate 28 that is made in the same manner as the gear housing 20b and the housing cover 21b is supported and fixed in a housing 9c. Using the intermediate plate 28, an intermediate portion of the output shaft 13b is supported at a location relatively closer to the rear end. In order to support and fix the intermediate plate 28 in the housing 9c, a portion of an inner peripheral surface of the housing 9c near the rear end opening is provided with a rearwardly facing step surface 29. An outer peripheral portion of the intermediate plate 28 is held between the step surface 29 and a front end surface of the housing cover 21b. The outer peripheral surface of the housing cover 21b and the outer peripheral surface of the gear housing 20b are provided with coupling flanges 30a, 30b at two diametrically opposite locations at which they are engaged to each other, respectively. In a state in which a portion of a front surface of the intermediate plate 28 near an outer periphery edge abuts on the step surface 29 and a rear end surface of the gear housing 20b abuts on a front surface of a flange portion 31 formed on a portion of the outer peripheral surface of the housing cover 21b near the front end, a front end surface of the housing cover 21b is butted to a portion of a rear surface of the intermediate plate 28 near an outer periphery edge. In this state, bolts inserted into through-holes formed in the respective coupling flanges 30a, 30b and nuts (not shown) are screwed and fastened to connect and fix the gear housing 20b and the housing cover 21b each other, so that the housing 9c is configured and the intermediate plate 28 is fixed in the housing 9c.

The output shaft 13b is rotatably supported at a radially inner side of the gear housing 20b and the intermediate plate 28 assembled as described above by a front-side rolling bearing 22b and a rear-side rolling bearing 23b. First, an outer ring of the front-side rolling bearing 22b is fitted into a through-hole 32, which is formed on a central part of the gear housing 20b along the front-rear direction and has a step surface formed to face the rear at an intermediate portion of an inner peripheral surface thereof A, from the rear and is prevented from being separated by a radially outer snap ring 33. An inner ring of the front-side rolling bearing 22b is fitted onto the output shaft 13b from the front together with a worm wheel 34 of the worm decelerator 7a and a rear surface inner peripheral portion of the worm wheel 34 is butted on a forwardly facing step surface formed on the outer peripheral surface B of the output shaft 13b and is prevented from being separated by a radially inner snap ring 35.

An outer ring of the rear-side rolling bearing 23b is fitted and secured into a cylindrical portion 36 formed on a central portion of the intermediate plate 28 by interference fit. A plurality of reinforcement ribs 37 arranged side by side in the circumferential direction is formed between an outer peripheral surface of the cylindrical portion 36 and a front surface of the intermediate plate 28, thereby ensuring rigidity of the cylindrical portion 36 and also supporting rigidity of the rear-side rolling bearing 23b. Each of the reinforcement ribs 37 extends in the radial direction and protrudes in the axial direction. An inner ring of the rear-side rolling bearing 23b is fitted and secured onto a large diameter portion, which is formed on a portion of the intermediate portion of the output shaft 13b near the rear end and has an outer diameter larger than both front and rear sides thereof, by the interference fit. A rear surface inner peripheral portion of the worm wheel 34 abuts on a step surface continuing from a front end edge of the large diameter portion.

A location of the cylindrical portion 36 of the intermediate plate 28 and a location of the outer peripheral portion of the intermediate plate 28 are shifted from each other in the axial direction. By the configuration, it is possible to reduce a radial compressive force, which is applied to the outer ring of the rear-side rolling bearing 23b when the intermediate plate 28 made of the resin is radially expanded and contracted due to heat. The inner ring of the rear-side rolling bearing 23b may be fitted to the outer side of the output shaft 13b by a gap fitting. The gap fitting absorbs axial thermal deformation of the intermediate plate 28. That is, the rear-side rolling bearing 23b is not influenced by the axial thermal deformation of the intermediate plate 28. Therefore, the performance of the electric power steering apparatus is not also influenced by the axial thermal deformation of the intermediate plate 28.

In order to rotatably support the output shaft 13b in the housing 9c so as to assemble the structure of this example configured as described above, the front-side rolling bearing 22b is held in the through-hole 32 of the gear housing 20b. In this state, the radially outer snap ring 33 is also mounted. Since the corresponding operations are performed before the other members are mounted in the gear housing 20b, the operations can be easily performed.

The worm wheel 34, the rear-side rolling bearing 23b and the intermediate plate 28 are mounted to the portion of the outer peripheral surface of the output shaft 13b near the rear end. The input shaft 12b is also coupled to the output shaft 13b via the torsion bar 11 and the torque measuring device 8b is also mounted. Also, as required, the input shaft 12b and the steering shaft 5 are coupled to each other. Since these operations are also performed before the output shaft 13b is mounted in the gear housing 20b, the operations can be easily performed. In the meantime, the housing cover 21b is loosely fitted on the outer side of the steering shaft 5 in advance, as required, and is rearwards moved so as not to disturb the assembling operation of the other members.

Then, the output shaft 13b is inserted into the inner ring of the front-side rolling bearing 22b from the rear towards the front, such that the rear end surface of the inner ring and a front end surface of a radially inner-side end portion of the worm wheel 34 abut each other. Then, the radially inner snap ring 35 is mounted. In this state, the front surface outer peripheral portion of the intermediate plate 28 is butted to the step surface 29. At this time, the housing cover 21b is forward moved to fit the front end portion of the housing cover 21b into the rear end portion of the gear housing 20b and to butt the front surface of the flange portion 31 to the rear end surface of the gear housing 20b. Also, the coupling flanges 30a, 30b are matched with each other as regards the phases thereof and are connected and fixed by the bolts and nuts or by screwing and fastening the bolts, which are inserted into the through-holes formed at the one coupling flanges 30b, 30b, into screw-holes formed at the other coupling flanges 30a, 30a. The series of operations are easy because an operator can perform the operations while seeing the same with naked eyes. In the meantime, the worm wheel 34 and a worm (not shown in FIG. 1), which configure the worm decelerator 7a, are engaged with each other by rotating the worm when mounting the electric motor 10 to the gear housing 20b. This is the same as the related art.

In the assembled electric power steering apparatus, the intermediate plate 28 is securely supported and fixed in the housing 9c configured by the gear housing 20b and the housing cover 21b. Therefore, a posture of the rear-side rolling bearing 23b, which is held on the inner peripheral surface C of the cylindrical portion 36 of the intermediate plate 28, is not changed even after the longtime using. For this reason, a posture of the output shaft 13b, which is rotatably supported by the rear-side rolling bearing 23b and the front-side rolling bearing 22b, is not changed even after the longtime using. As a result, the engaged state of the worm decelerator 7a is not degraded and the measuring precision of the torque measuring device 8b is not deteriorated.

The intermediate plate 28 may be made by the injection molding of a synthetic resin. The synthetic resin that can be preferably used includes a thermosetting resin or thermoplastic resin containing reinforced fibers of about 20 to 60 capacity %.

That is, as the resin, it is preferable to use a resin that consists of a resin composition of which mechanical properties are less lowered and which can be continuously used even at temperature environments of −40° C. to 85° C. that are using environmental temperatures at a column part of the electric power steering apparatus, that has the high size stability so as to suppress a gap between members and compression due to the expansion, specifically has a linear expansion coefficient of $1.2 \times 10^{-5}$ to $5.5 \times 10^{-5}$ (1/° C.) in both longitudinal and transverse directions of fibers within a temperature range of 23° C. to 80° C. and that has a water absorption rate of 4% or lower when it is left in water at 23° C. for 24 hours.

Also, when exposed to high-temperature and high-humidity environments for a long time upon carrying of the intermediate plate, the resin part may be damaged by the lowering of the mechanical properties, which is caused due to moisture absorption deterioration of the intermediate plate made of the resin. Therefore, the resin preferably has a tensile strength retention of 70% or higher after it is left under environments of 85° C. and 85% RH for 500 hours.

However, since it is difficult to implement the above characteristics only with the resin material, a material having a fiber-like filling material contained in the resin material is used.

Here, the resin composition that can be continuously used even at the temperature environments of −40° C. to 85° C. may include, but not particularly limited to, so-called engineering plastics such as poly ethylene terephthalate (PET), poly buthylene terephthalate (PBT), polyamide (PA) 6, polyamide 11, polyamide 12, polyamide 66, polyamide 610, polyamide 612, polyamide 46, polyamide 410, modified polyamide 6T, polyamide 9T and the like, and so-called super engineering plastic resins such as fluorine resin, polyphenylene sulfide (PPS), polyether sulfone (PES), polyether imide (PEI), poly amide imide (PAI), thermoplastic polyimide, polyether ether ketone (PEEK), polyether nitrile (PEN) and the like, which may be used individually or in combination thereof. Among them, poly ethylene terephthalate (PET), polyamide 66, polyamide 46 and polyphenylene sulfide have favorable costs and good performance balances and thus may be preferably used. Also, for a utility requiring the heat resistance and the size stability, a thermosetting resin such as phenol resin, urea resin, unsaturated polyester resin, polyurethane resin and the like may be favorably used.

In the resin, the linear expansion coefficient in both the longitudinal and transverse directions of fibers within a temperature range of 23° C. to 80° C. is preferably within a range of $1.2 \times 10^{-5}$ to $5.5 \times 10^{-5}$ (1/° C.). When the linear expansion coefficient is smaller than $1.2 \times 10^{-5}$ (1/° C.), since a linear expansion coefficient of the rear-side rolling bearing 23, which is press-fitted into the radially inner side of the intermediate plate 28, is 1.2×10−5 (1/° C.), a difference occurs between the linear expansion coefficient of the intermediate plate 28 and the linear expansion coefficient of the rear-side rolling bearing 23, so that a gap may occur between the cylindrical portion 36 and the outer diameter surface of the rear-side rolling bearing 23. On the other hand, when the linear expansion coefficient is larger than 5.5×10−5 (1/° C.), the intermediate plate presses an output-side housing member 1a upon the expansion thereof, so that excessive load stress is generated. As a result, the intermediate plate 28 is damaged.

In the resin, the fiber-like filling material may include, but not particularly limited to, a glass fiber, a carbon fiber, a metallic fiber, an aramid fiber, an aromatic polyimide fiber, a liquid crystal polyester fiber, a silicon carbide fiber, an alumina fiber, a boron fiber and the like. Among them, the glass fiber and the carbon fiber have a favorable reinforcement ability and are thus preferable. As the glass fiber, an insulating glass fiber that less influences the electromagnetic induction of the torque measuring device 8 is more preferable.

A content of the fiber-like filling material in the entire composition is preferably 30 to 55 mass %, and more preferably 35 to 55 mass %. Even when the fiber-like filling material is mixed in excess of 55 mass %, the melting fluidity of the resin composition is remarkably lowered to thus deteriorate the moldability, further improvements on the mechanical properties and the size stability cannot be expected and the deformability of the material is considerably reduced, so that the intermediate plate 28 may be damaged when molding or assembling the intermediate plate 28. In contrast, when the content of the fiber-like filling material in the entire composition is smaller than 30 mass %, the reinforcement effect of the mechanical properties is small and the size stability is also insufficient. The size stability means that the linear expansion coefficient is within the range of $1.2 \times 10^{-5}$ to $5.5 \times 10^{-5}$ (1/° C.) in both the longitudinal and transverse directions of fibers within the temperature range of 23° C. to 80° C. and the water absorption rate is 4% or lower when the intermediate plate is left in water at 23° C. for 24 hours.

Also, the fiber-like filling material of the resin configuring the intermediate plate 28 may be treated with a coupling agent such as a silane-based coupling agent, a titanate-based coupling agent and the like so as to have affinity between the resin and the fiber-like filling material to thus improve adhesiveness and dispersiveness of the resin and the fiber-like filling material or may be treated with surface treatment agents for the other purposes. However, the invention is not limited thereto.

In the meantime, a variety of additives may be mixed within a range not deteriorating the object of the invention. For example, a solid lubricant such as graphite, hexagonal boron nitride, fluorine mica, tetrafluoroethylene resin powder, tungsten disulfide, molybdenum disulfide and the like, inorganic powder, organic powder, lubricant oil, plasticizer, rubber, resin, antioxidant, thermal stabilizer, ultraviolet absorber, photoprotective agent, flame retardant, antistatic agent, mold release agent, flow modifier, thermal conductivity improver, non-tackifier, crystallization promoter, nucleating agent, pigment, dye and the like may be exemplified. When the polyester-based resin such as PET and PBT is applied as the base resin of the intermediate plate, the moisture absorption deterioration, specifically the hydrolysis deterioration may be concerned. Therefore, hydrolysis inhibitor is preferably added to increase the tolerance thereto. The hydrolysis inhibitor that is added to the polyester-based base resin applied to the intermediate plate is not particularly limited, and carbodiimide compound having one or more carbodiimide groups in a molecule, higher fatty acid, higher fatty acid insoluble salt, higher aliphatic alcohol and hydrophobizing agent such as hydrophobic silica or aromatic monofunctional epoxy compound containing one glycidyl group in a molecule, aromatic multifunctional epoxy compound containing two or more glycidyl groups in a molecule or piperidine derivative, piperadine derivative and the like may be favorably used. The hydrolysis inhibitor may be added to the polyester-based resin in an amount of 0.01 to 5 mass %, preferably 0.05 to 2 mass %. As a method of mixing the base resin, the fiber-like filling material and the additive, a method of impregnating continuous fiber bundles of the fiber-like filling material into a melted resin, in which a variety of additives except for the fiber-like filling material are mixed, and then cooling and pelletizing the same may be exemplified. Although a temperature upon the melt impregnation is not particularly limited, the temperature may be appropriately selected within a range of temperatures in which the resin becoming a base material is sufficiently melted and is not deteriorated.

A method of manufacturing the intermediate plate 28 is not particularly limited. For example, the intermediate plate 28 can be formed by the typical methods such as the injection molding, the compression molding, the transfer molding the like. Among them, the injection molding is preferable because it has high productivity and can provide the inexpensive intermediate plate 28. In the meantime, in order to suppress the damage of the fiber-like filling material upon the injection molding, it is preferable to make a nozzle diameter of an injection molding machine or gate diameter of a mold large or to suppress a back pressure to be low upon the molding.

The intermediate plate 28 can be made by the die-cast molding of a light-weight alloy such as aluminum alloy.

Figure 1:
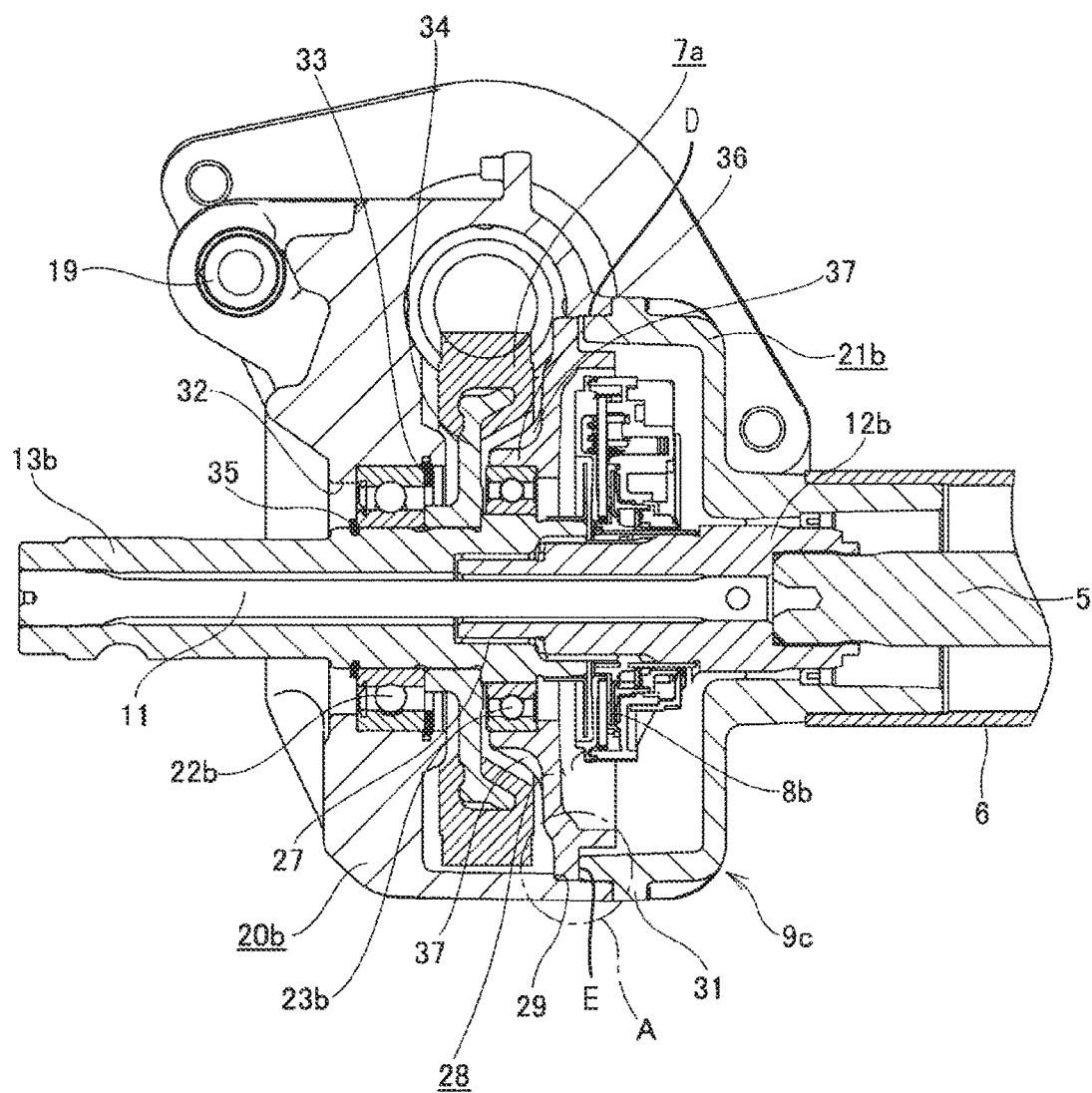
FIG. 1 is a sectional view of a part of an electric power steering apparatus according to a first embodiment of the invention.
Figure 2:
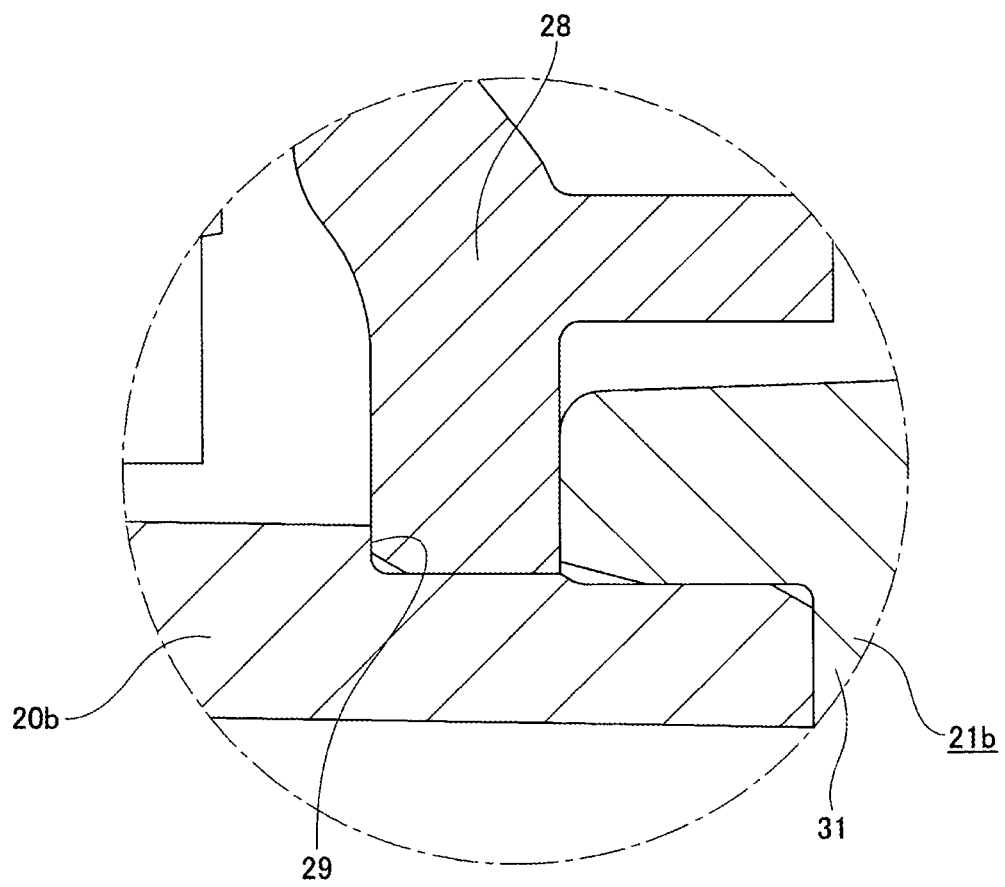
FIG. 2 is an enlarged view of the portion A of FIG. 1.
Figure 3:
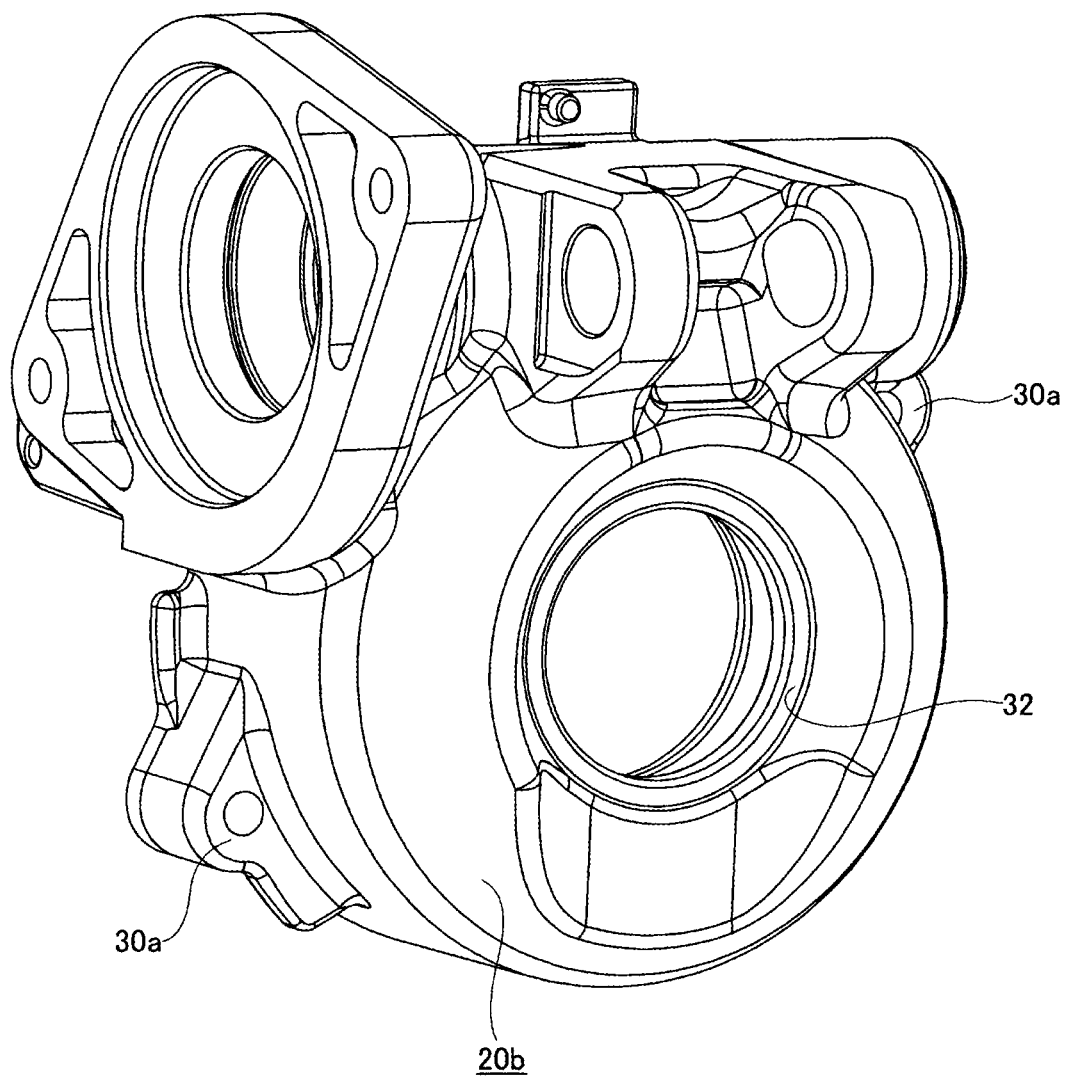
FIG. 3 is a front perspective view of a gear housing of the electric power steering apparatus.
Figure 4:
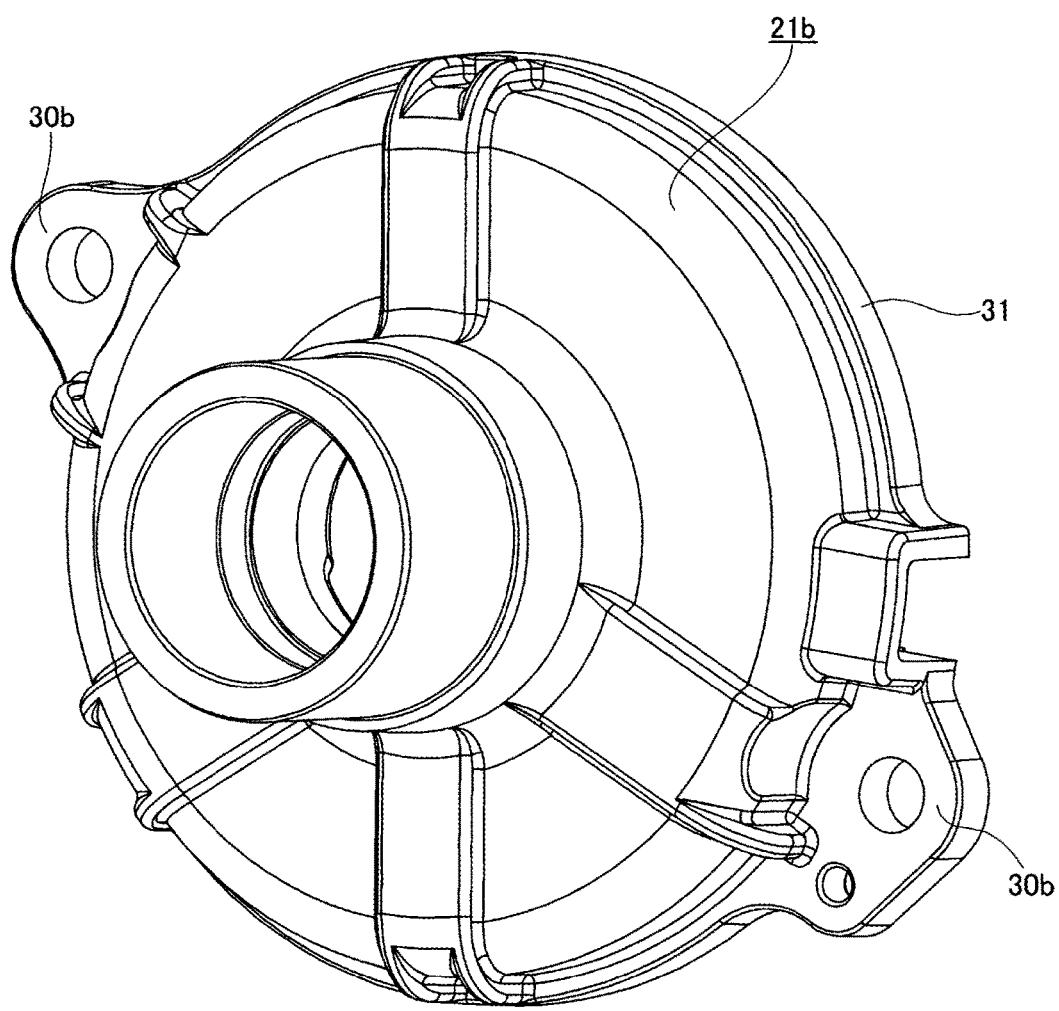
FIG. 4 is a rear perspective view of a housing cover of the electric power steering apparatus.
Figure 5A:
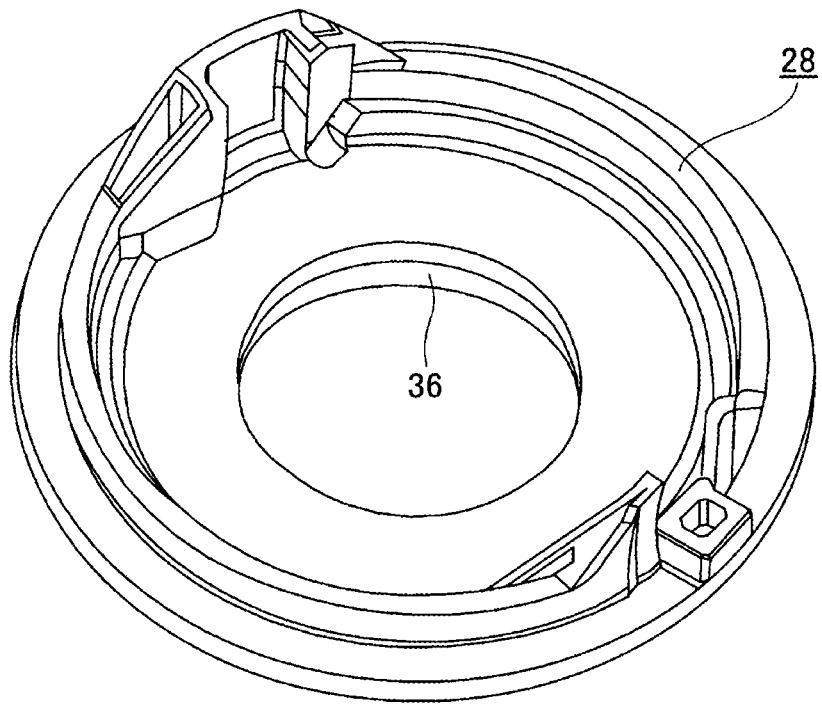
FIG. 5A is a rear perspective view of an intermediate plate of the electric power steering apparatus.
Figure 5B:
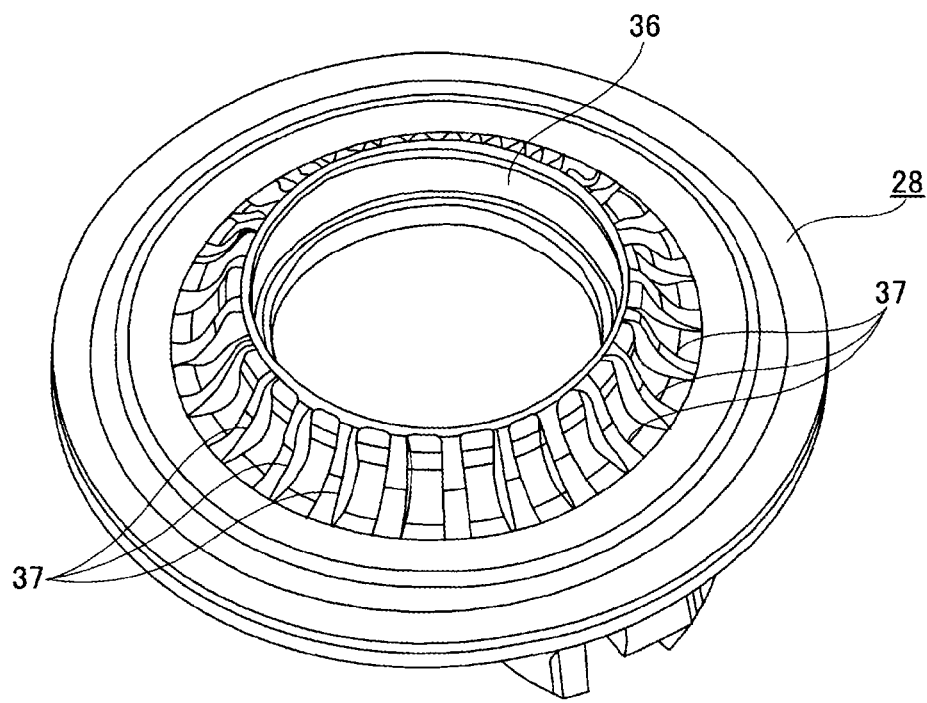
FIG. 5B is a front perspective view of the intermediate plate.
Figure 6A:
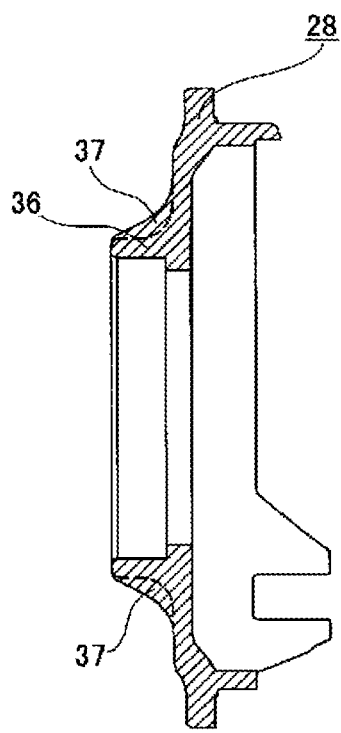
FIG. 6A is a sectional view of the intermediate plate.
Figure 6B:
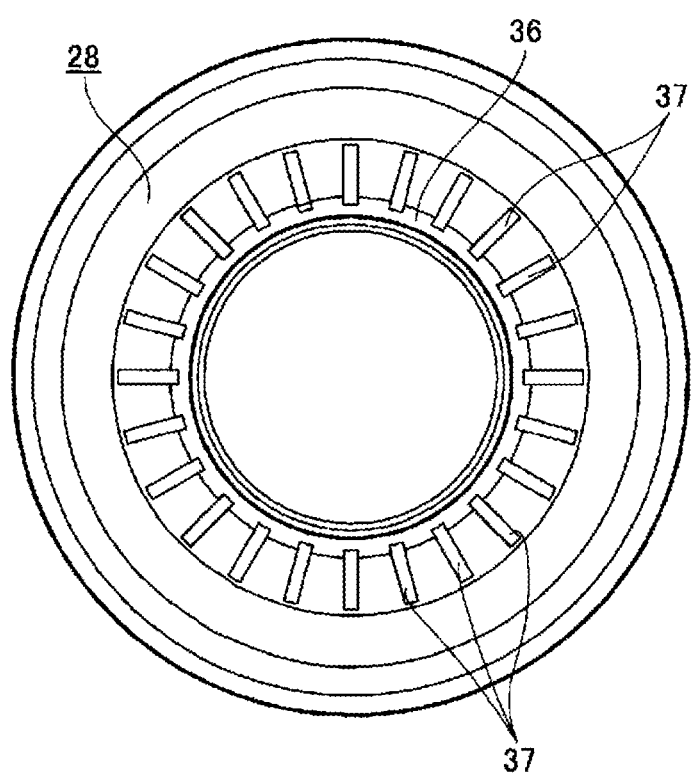
FIG. 6B is a front view of the intermediate plate.
Figure 6C:
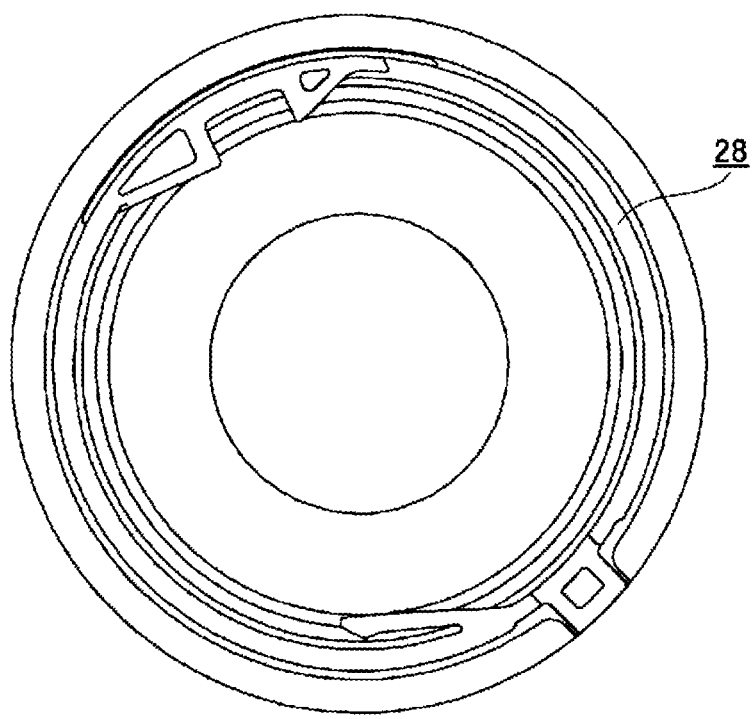
FIG. 6C is a rear view of the intermediate plate.
Figure 7:
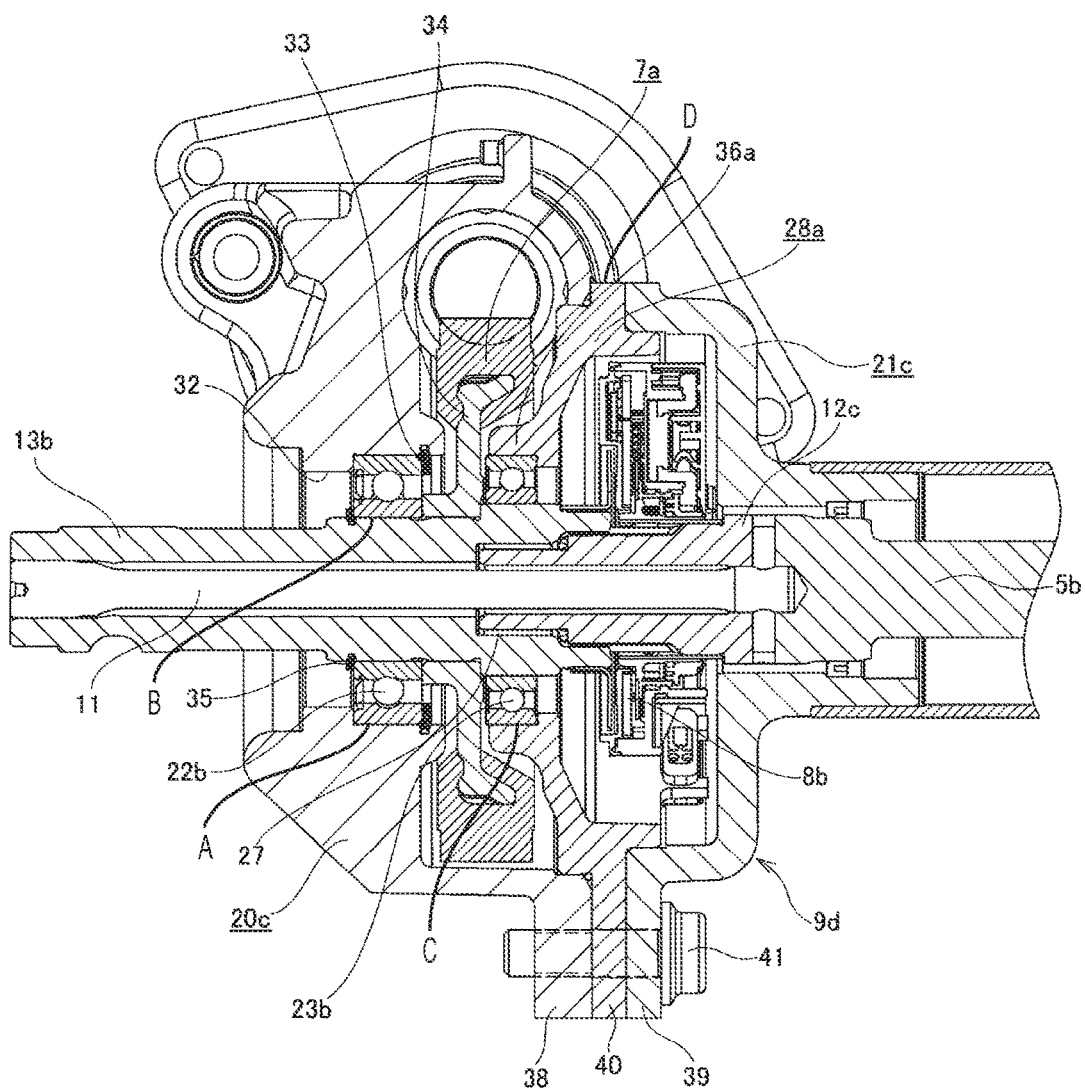
FIG. 7 is a sectional view of a part of an electric power steering apparatus according to a second embodiment of the invention.

FIG. 7 shows a second embodiment of the invention. In this example, an intermediate flange portion 40 formed on an outer peripheral surface of an intermediate plate 28a is interposed between a front flange portion 38, which is formed on a rear end portion outer peripheral surface of a gear housing 20c, and a rear flange portion 39, which is formed on a front end portion outer peripheral surface of a housing cover 21c. In this state, the peripheries of the respective members 20c, 21c, 28a are fitted one another, thereby positioning the respective members 20c, 21c, 28a in the radial direction. Also, the intermediate plate 28a is fixed in a housing 9d, which is configured by combining the gear housing 20c and the housing cover 21c, by screwing and fastening bolts 41, which are inserted into through-holes formed at circumferential parts at which the rear flange portion 39 and the intermediate flange portion 40 are matched each other from the rear, into screw holes formed at the front flange portion 38. Meanwhile, in this example, a cylindrical portion 36a of the intermediate plate 28a is configured to be thicker, compared to the first embodiment, and the reinforcement ribs are omitted. Furthermore, in this example, an input shaft 12c and a steering shaft 5c are integrated. Since the configurations and operations of the other parts are the same as the first embodiment, the equivalent parts are indicated with the reference numerals and the overlapping descriptions thereof are omitted.

Figure 8:
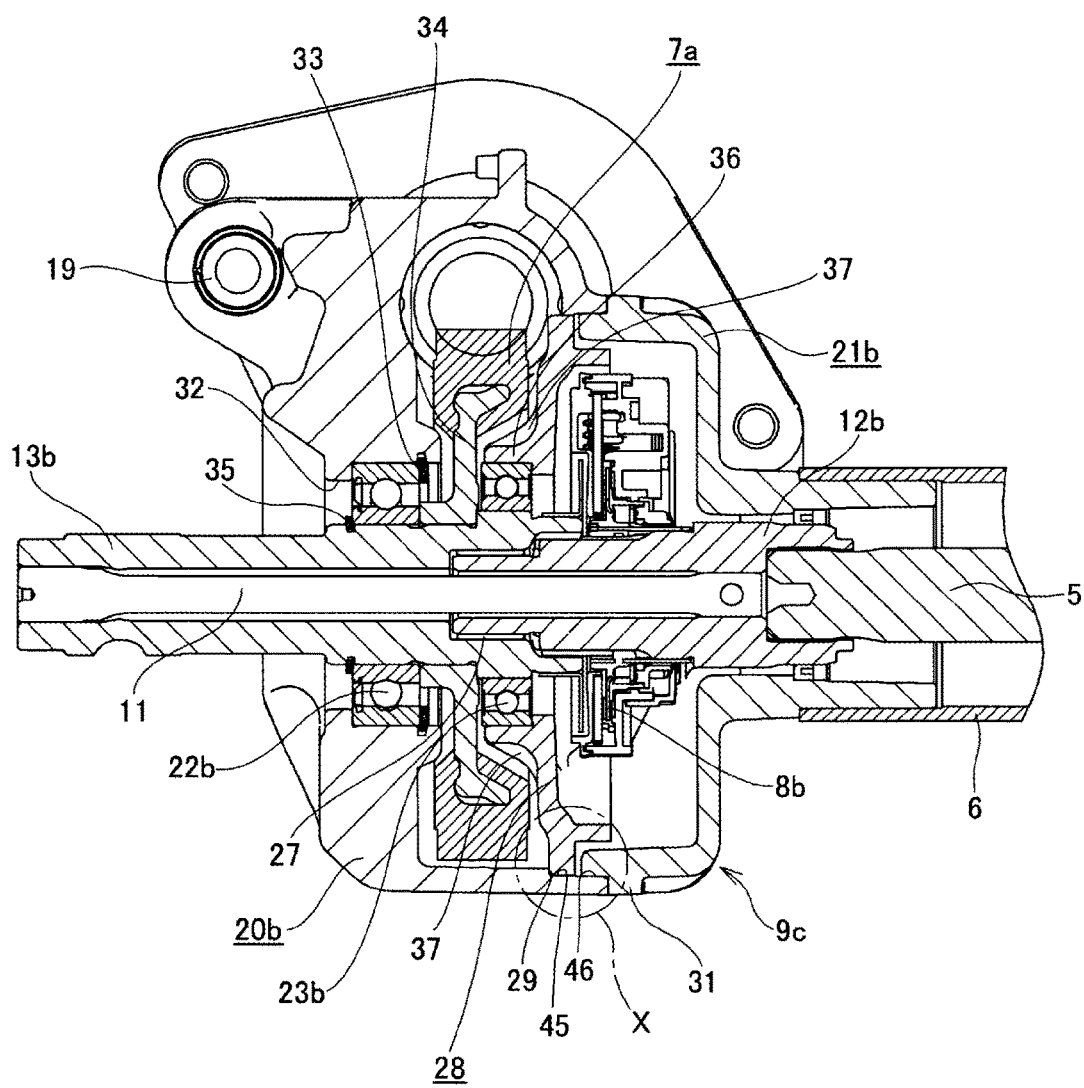
FIG. 8 is a sectional view of a part of an electric power steering apparatus according to a third embodiment of the invention.
Figure 9:
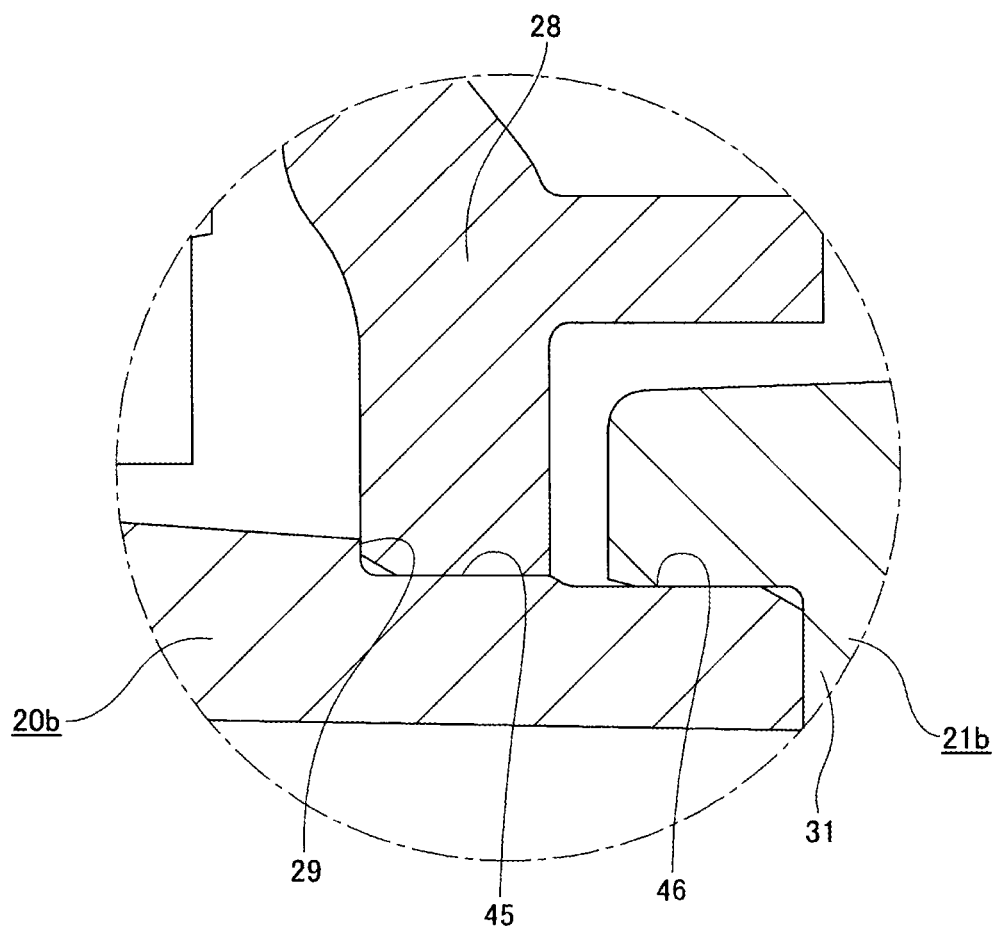
FIG. 9 is an enlarged view of the portion X of FIG. 8.

FIGS. 8 and 9 show a third embodiment of the invention. In the electric power steering apparatus of this example, the intermediate plate 28, which is made in the same manner as the gear housing 20b and the housing cover 21b, is press-fitted and fixed in the housing 9c by the interference fit. A portion of the intermediate portion of the output shaft 13b near the rear end is supported using the intermediate plate 28. In this example, in order to press-fit and fix the intermediate plate 28 at a predetermined position in the housing 9c, a portion of the inner peripheral surface of the gear housing 20b near the rear end opening is provided with the rearwardly facing step surface 29. A rear-side part of the step surface 29 of the inner peripheral surface of the gear housing 20b has a cylindrical shape having a step at which a small diameter portion 45 near the step surface 29 and a large diameter portion 46 of an opening-side far from the step surface 29 are made to continue by a small step part. An outer diameter of the intermediate plate 28 at a free state is made to be slightly larger than an inner diameter of the small diameter portion 45 at a free state. An inner diameter of the large diameter portion 46 at a free state is made to be slightly larger than the outer diameter of the intermediate plate 28 at a free state. The intermediate plate 28 is press-fitted to the small diameter portion 45 and a front surface outer peripheral portion D of the intermediate plate 28 is butted to the step surface 29, so that the intermediate plate 28 is press-fitted and fixed at the predetermined position in the housing 9c.

The rear end opening portion E of the gear housing 20b is blocked by the housing cover 21b. The outer peripheral surface of the gear housing 20b and the outer peripheral surface of the housing cover 21b are provided with the coupling flanges 30a, 30b at two diametrically opposite locations at which they are engaged to each other, respectively. The intermediate plate 28 is press-fitted and fixed in the gear housing 20b, the front end portion of the housing cover 21b is fitted in the large diameter portion 46 of the rear end opening portion of the gear housing 20b without play, and the front surface of the flange portion 31 formed on a portion of the outer peripheral surface of the housing cover 21b near the front end is butted to the rear end surface of the gear housing 20b. In this state, bolts inserted into through-holes formed in the respective coupling flanges 30a, 30b and nuts (not shown) are screwed and fastened to connect and fix the gear housing 20b and the housing cover 21b each other, thereby configuring the housing 9c.

The output shaft 13b is assembled as described above and is rotatably supported in the gear housing 20b, in which the intermediate plate 28 is press-fitted and fixed, by the front-side and rear-side rolling bearings 22b, 23b.

In this example, when mounting the output shaft 13b into the gear housing 20b, while the intermediate plate 28 is press-fitted to the small diameter portion 45 of the gear housing 20b, the output shaft 13b is inserted into the inner ring of the front-side rolling bearing 22b from the rear towards the front, such that the rear end surface of the inner ring and the front end surface of the radially inner-side end portion of the worm wheel 34 abut each other. Then, the radially inner-side snap ring 35 is mounted. In this state, the front surface outer peripheral portion of the intermediate plate 28 is butted to the step surface 29. At this time, the housing cover 21b is forward moved to fit the front end portion of the housing cover 21b into the large diameter portion 46 of the rear end portion inner peripheral surface of the gear housing 20b and to butt the front surface of the flange portion 31 to the rear end surface of the gear housing 20b. Also, the respective coupling flanges 30a, 30b are matched with each other as regards the phases thereof and are connected and fixed by the bolts and nuts or by screwing and fastening the bolts, which are inserted into the through-holes formed at the one coupling flanges 30b, 30b, into screw-holes formed at the other coupling flanges 30a, 30a.

In the assembled electric power steering apparatus, the intermediate plate 28 is securely supported and fixed in the housing 9c configured by the gear housing 20b and the housing cover 21b. Therefore, a posture of the rear-side rolling bearing 23b, which is held on the inner peripheral surface of the cylindrical portion 36 of the intermediate plate 28, is not changed even after the longtime using. For this reason, a posture of the output shaft 13b, which is rotatably supported by the rear-side rolling bearing 23b and the front-side rolling bearing 22b, is not changed even after the longtime using. As a result, the engaged state of the worm decelerator 7a is not degraded and the measuring precision of the torque measuring device 8b is not deteriorated. Since the configurations and operations of the other parts are the same as the first embodiment, the equivalent parts are indicated with the reference numerals and the overlapping descriptions thereof are omitted.

Figure 10:
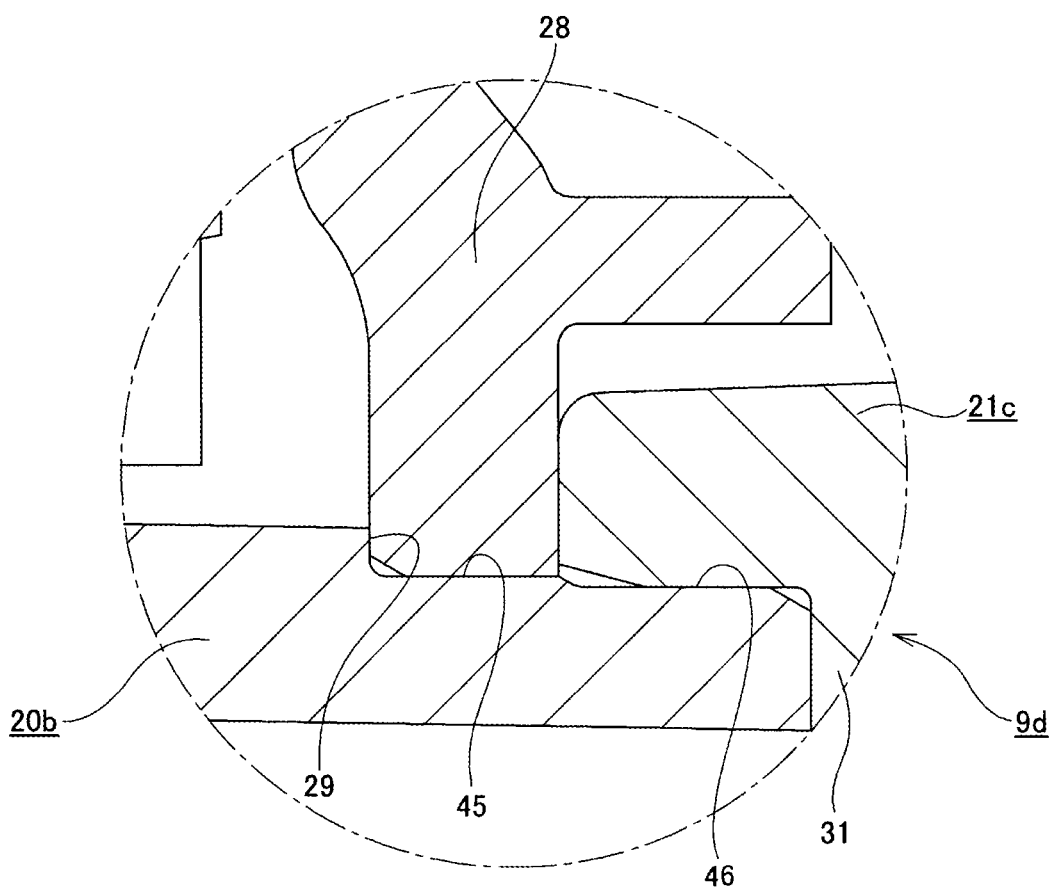
FIG. 10 is an enlarged view showing a fourth embodiment of the invention, which is the same as FIG. 9.

FIG. 10 shows a fourth embodiment of the invention. In this example, a front end surface of the housing cover 21c abuts on a rear surface outer peripheral edge part of the intermediate plate 28. Therefore, in this example, a fixing force of the intermediate plate 28 to the housing 9d becomes a sum of a frictional force, which is applied between the outer peripheral surface of the intermediate plate 28 and the small diameter portion 45 of the gear housing 20b on the basis of the press-fitting, and a holding force by the step surface 29 of the gear housing 20b and the front end surface of the housing cover 21c. Hence, the fixing strength of the intermediate plate 28 to the housing 9d is increased. Since the configurations and operations of the other parts are the same as the third embodiment, the equivalent parts are indicated with the reference numerals and the overlapping descriptions thereof are omitted.

Figure 11:
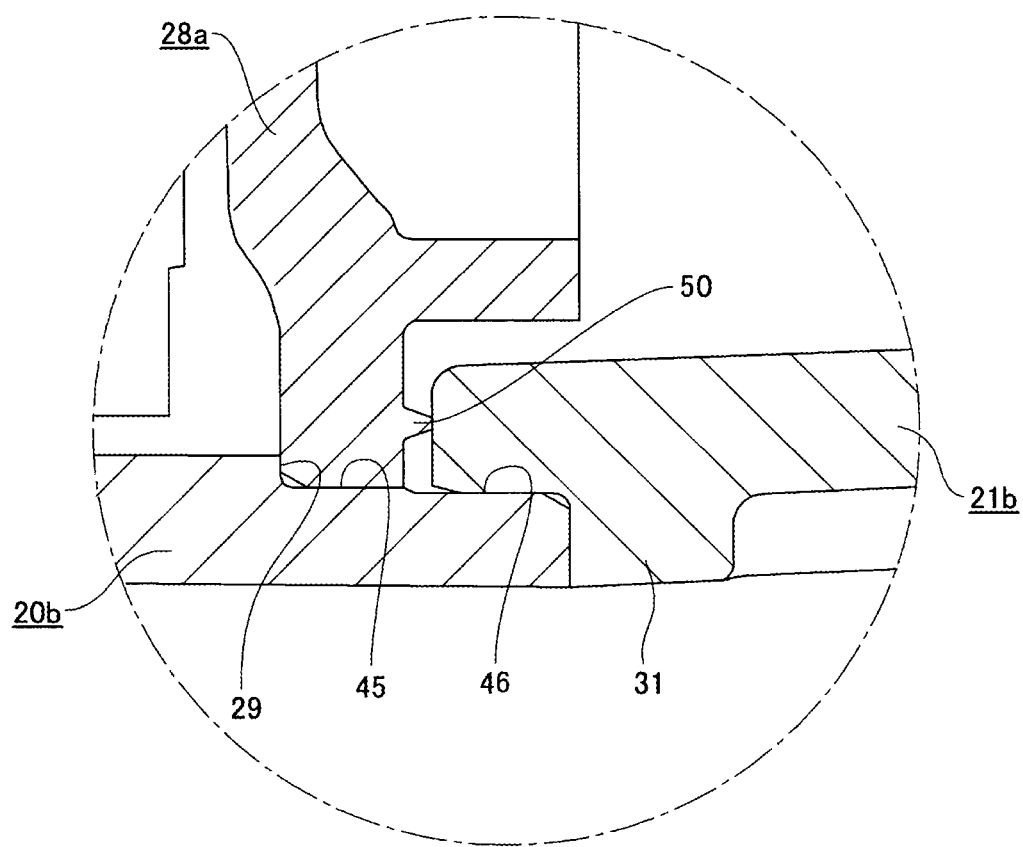
FIG. 11 is an enlarged view showing a fifth embodiment of the invention, which is the same as FIG. 9.
Figure 12A:
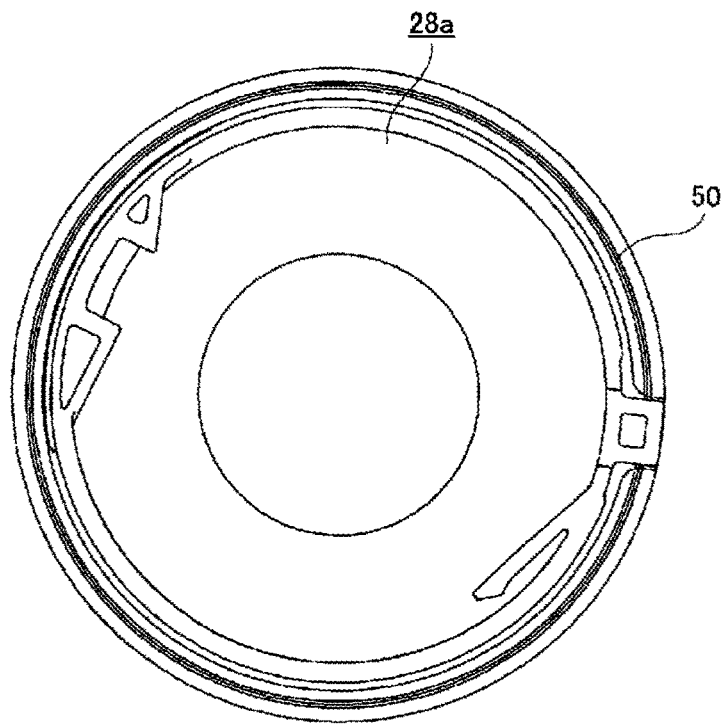
FIG. 12A is a rear view of an intermediate plate of the fifth embodiment.
Figure 12B:
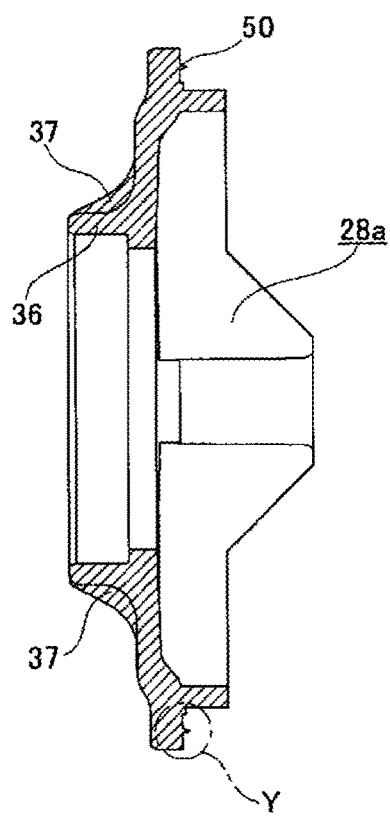
FIG. 12B is a sectional view of the intermediate plate of the fifth embodiment.
Figure 12C:
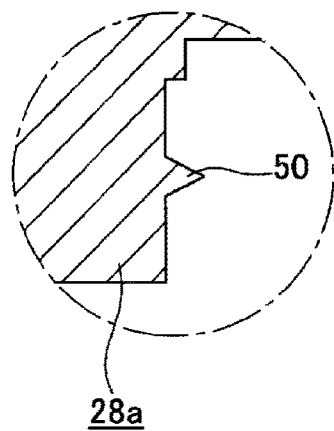
FIG. 12C is an enlarged view of the portion Y of FIG. 12B.

FIGS. 11 and 12 show a fifth embodiment of the invention. In this example, a ridge 50 having a triangular sectional shape and a width in the radial direction reducing towards the distal end thereof is formed on a rear surface outer peripheral portion of the intermediate plate 28a over an entire circumference thereof. During the process of connecting and fixing the gear housing 20b and the housing cover 21b, the front end surface of the housing cover 21b is butted to the rear surface outer peripheral portion of the intermediate plate 28a, while flattening the ridge 50 by the front end surface of the housing cover 21b.

In the above structure of this example, in order to connect and fix the gear housing 20b and the housing cover 21b, the ridge 50 is flattened while screwing and fastening the bolts and nuts (or screw holes). For this reason, it is possible to prevent the bolts from being unfastened while suppressing the force necessary to fasten the bolts to be low (while reducing the loss of the axial force). Since the configurations and operations of the other parts are the same as the fourth embodiment, the illustrations and descriptions of the equivalent parts are omitted.

Figure 13:
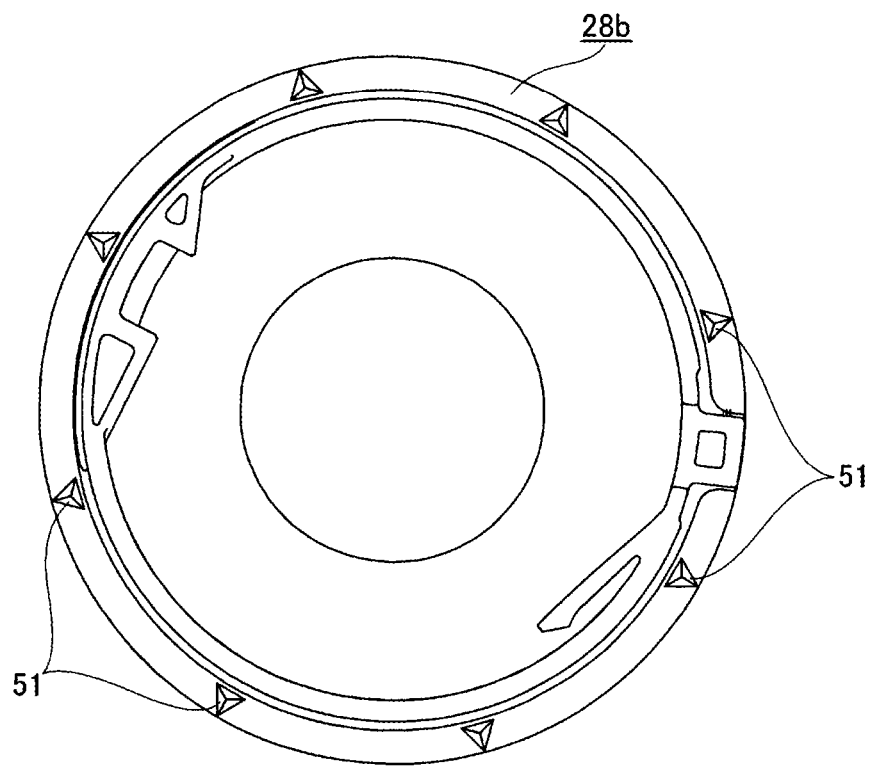
FIG. 13 is a rear view of an intermediate plate of a sixth embodiment of the invention.

FIG. 13 shows a sixth embodiment of the invention. In this example, projections 51, 51 each of which has a triangular pyramid shape are formed at a plurality of positions equally spaced in the circumferential direction on the rear surface outer peripheral portion of an intermediate plate 28b. During the process of connecting and fixing the gear housing 20b and the housing cover 21b (see FIG. 8), the front end surface of the housing cover 21b is butted to the rear surface outer peripheral portion of the intermediate plate 28b, while flattening the respective projections 51, 51 by the front end surface of the housing cover 21b.

In the above structure of this example, in order to connect and fix the gear housing 20b and the housing cover 21b, the respective projections 51, 51 are flattened while screwing and fastening the bolts and nuts (or screw holes). For this reason, like the fifth embodiment, it is possible to prevent the bolts from being unfastened while suppressing the force necessary to fasten the bolts to be low. Since the configurations and operations of the other parts are the same as the fourth embodiment, the illustrations and descriptions of the equivalent parts are omitted.

Figure 14A:
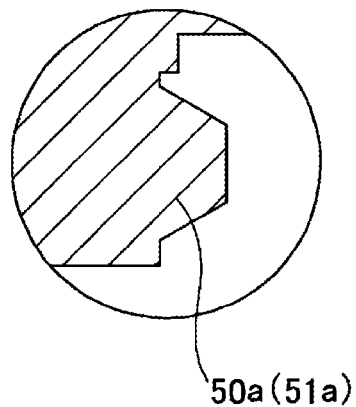
FIG. 14A is a partially enlarged sectional view showing another example of a sectional shape of a ridge or projection.
Figure 14B:
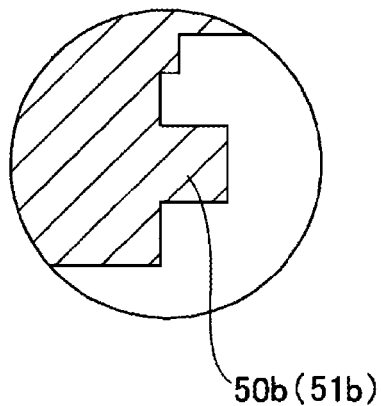
FIG. 14B is a partially enlarged sectional view showing still another example of the sectional shape of the ridge or projection.
Figure 14C:
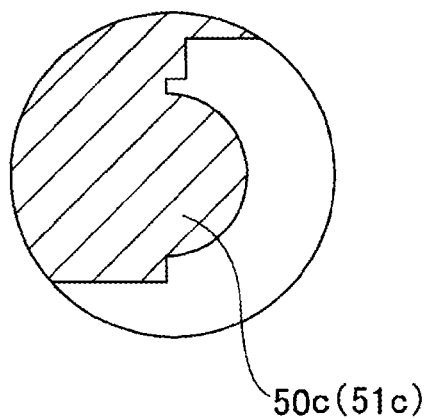
FIG. 14C is a partially enlarged sectional view showing further still another example of the sectional shape of the ridge or projection.

Meanwhile, in the fifth and sixth embodiments, the sectional shape of the ridge 50 or projection 51 is not limited to the triangle. As long as a sectional shape can be appropriately flattened by the fastening of the bolts, a ridge 50a having a trapezoidal sectional shape as shown in FIG. 14A (or a projection 51a having a truncated cone shape), a ridge 50b having a quadrilateral sectional shape as shown in FIG. 14B (or a projection 51b having a cylindrical shape) or a ridge 50c having a semicircular sectional shape as shown in FIG. 14B (or a projection 51c having a semicircular shape) is also possible.

This application is a National Stage of International Application No. PCT/JP2013/079176 filed Oct. 28, 2013, claiming priority from Japanese Patent Application No. 2012-237790 filed on Oct. 29, 2012 and Japanese Patent Application No. 2012-237791 filed on Oct. 29, 2012, the contents of which are incorporated herein by reference.

DESCRIPTION OF REFERENCE SIGNS

1: steering wheel
3: input shaft
5, 5a, 5b: steering shaft
7, 7a: worm decelerator
10: electric motor
12, 12a, 12b, 12c: input shaft
13, 13a, 13b: output shaft
20, 20a, 20b, 20c: gear housing
21, 21a, 21b, 21c: housing cover
22, 22a, 22b: first rolling bearing
23, 23a, 23b: second rolling bearing
28, 28a: intermediate plate
29: step surface
30a, 30b: coupling flange
32: through-hole
38: front flange portion
39: rear flange portion
40: intermediate flange portion
50, 50a, 50b, 50c: ridge
51, 51a, 51b, 51c: projection

The invention claimed is:

1. An electric power steering apparatus comprising:
an output shaft which rotates to apply a steering angle to wheels and extends in an axial direction;
a gear housing having a through-hole inside which the output shaft is rotatably supported, the gear housing accommodating a decelerator which reduces a speed of a rotation of a driving shaft of an electric motor to transmit the rotation to the output shaft;
a first rolling bearing and a second rolling bearing spaced from each other in an axial direction of the output shaft to rotatably support the output shaft on the gear housing;
a housing cover coupled to and secured to the gear housing, such that an input shaft is inserted therein, the input shaft being rotated by a steering shaft to be rotated based on an operation of a steering wheel; and
an intermediate plate,
wherein the first rolling bearing is provided between an inner peripheral surface of the through-hole and an outer peripheral surface of the output shaft,
wherein the second rolling bearing is provided between an inner peripheral surface of the intermediate plate and the outer peripheral surface of the output shaft, and
wherein the intermediate plate comprises an outer peripheral portion supported and fixed in an opening portion of the gear housing,
wherein the electric power steering apparatus further comprises:
a front flange portion formed on an outer peripheral surface of a rear end portion of the gear housing and extending toward a radially outer side;
a rear flange portion formed on an outer peripheral surface of a front end portion of the housing cover and extending toward the radially outer side;
an intermediate flange portion formed on an outer peripheral surface of the intermediate plate and extending toward the radially outer side,
wherein the intermediate flange portion is held between the front flange portion and the rear flange portion in the axial direction,
wherein a rear portion of an inner peripheral surface of the gear housing comprises a rearwardly facing step surface, and
wherein the outer peripheral portion of the intermediate plate is held between the step surface and a front end surface of the housing cover.

2. The electric power steering apparatus according to claim 1, wherein the first rolling bearing is provided on an intermediate portion of the output shaft, and
wherein the second rolling bearing is provided on a portion of the output shaft closer to a rear end of the output shaft than the intermediate portion.

3. The electric power steering apparatus according to claim 1, wherein the intermediate plate is made by an injection molding of a thermosetting resin or a thermoplastic resin containing glass fibers.

4. The electric power steering apparatus according to claim 1, wherein the intermediate plate comprises a cylindrical portion formed on a central portion of the intermediate plate,
wherein an outer ring of the second rolling bearing is fitted and secured into the cylindrical portion, and
wherein a location of the cylindrical portion of the intermediate plate and a location of the outer peripheral portion of the intermediate plate are shifted from each other in the axial direction.

5. An electric power steering apparatus comprising:
an output shaft which rotates to apply a steering angle to wheels and extends in an axial direction;
a gear housing having a through-hole inside which the output shaft is rotatably supported, the gear housing accommodating a decelerator which reduces a speed of a rotation of a driving shaft of an electric motor to transmit the rotation to the output shaft;
a first rolling bearing and a second rolling bearing spaced from each other in an axial direction of the output shaft to rotatably support the output shaft on the gear housing;
a housing cover coupled to and secured to the gear housing, such that an input shaft is inserted therein, the input shaft being rotated by a steering shaft to be rotated based on an operation of a steering wheel; and
an intermediate plate,
wherein the first rolling bearing is provided between an inner peripheral surface of the through-hole and an outer peripheral surface of the output shaft,
wherein the second rolling bearing is provided between an inner peripheral surface of the intermediate plate and the outer peripheral surface of the output shaft, and
wherein the intermediate plate comprises an outer peripheral portion supported and fixed in an opening portion of the gear housing,
wherein the electric power steering apparatus further comprises:
a front flange portion formed on an outer peripheral surface of a rear end portion of the gear housing and extending toward a radially outer side;
a rear flange portion formed on an outer peripheral surface of a front end portion of the housing cover and extending toward the radially outer side;

an intermediate flange portion formed on an outer peripheral surface of the intermediate plate and extending toward the radially outer side, wherein the intermediate flange portion is held between the front flange portion and the rear flange portion in the axial direction, wherein the intermediate plate is press-fitted and fixed to a rear portion of an inner peripheral surface of the gear housing by interference fit, wherein the rear portion of the inner peripheral surface of the gear housing comprises a rearwardly facing step surface, and wherein a front surface of the outer peripheral portion of the intermediate plate abuts the step surface such that the intermediate plate is positioned in the axial direction of the output shaft relative to the gear housing.

6. The electric power steering apparatus according to claim 5, wherein a front end surface of the housing cover abuts on a rear surface of the outer peripheral portion of the intermediate plate.

7. The electric power steering apparatus according to claim 6, wherein the rear surface of the outer peripheral portion of the intermediate plate is formed with a ridge in a circumferential direction, and wherein the ridge has a flattened portion.

8. The electric power steering apparatus according to claim 6, wherein the rear surface of the outer peripheral portion of the intermediate plate is formed with a plurality of projections in a circumferential direction, and wherein the projections have a flattened portion.

9. An electric power steering apparatus comprising:

an output shaft which rotates to apply a steering angle to wheels and extends in an axial direction;

a gear housing having a through-hole inside which the output shaft is rotatably supported, the gear housing accommodating a decelerator which reduces a speed of a rotation of a driving shaft of an electric motor to transmit the rotation to the output shaft;

a first rolling bearing and a second rolling bearing spaced from each other in an axial direction of the output shaft to rotatably support the output shaft on the gear housing;

a housing cover coupled to and secured to the gear housing, such that an input shaft is inserted therein, the input shaft being rotated by a steering shaft to be rotated based on an operation of a steering wheel; and an intermediate plate, wherein the first rolling bearing is provided between an inner peripheral surface of the through-hole and an outer peripheral surface of the output shaft, wherein the second rolling bearing is provided between an inner peripheral surface of the intermediate plate and the outer peripheral surface of the output shaft, and wherein the intermediate plate comprises an outer peripheral portion supported and fixed in an opening portion of the gear housing, wherein the electric power steering apparatus further comprises:

a front flange portion formed on an outer peripheral surface of a rear end portion of the gear housing and extending toward a radially outer side;

a rear flange portion formed on an outer peripheral surface of a front end portion of the housing cover and extending toward the radially outer side;

an intermediate flange portion formed on an outer peripheral surface of the intermediate plate and extending toward the radially outer side, wherein the intermediate flange portion is held between the front flange portion and the rear flange portion in the axial direction, wherein the intermediate plate comprises a cylindrical portion formed on a central portion of the intermediate plate, wherein an outer ring of the second rolling bearing is fitted and secured into the cylindrical portion, and wherein a plurality of reinforcement ribs arranged side by side in a circumferential direction is formed between an outer peripheral surface of the cylindrical portion and a front surface of the intermediate plate.

* * * * *